Figure 1:
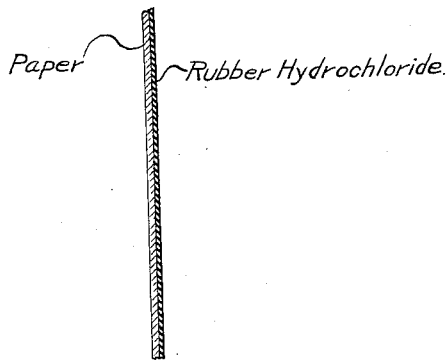

Aug. 1, 1939.  W. C. CALVERT  2,167,634

PACKAGE

Filed Aug. 16, 1933

Inventor
William C. Calvert

By R.H. Waters

Attorney

Patented Aug. 1, 1939

2,167,634

UNITED STATES PATENT OFFICE 2,167,634

PACKAGE

William C. Calvert, Cuyahoga Falls, Ohio, assignor to Wingfoot Corporation, Wilmington, Del., a corporation of Delaware Application August 16, 1933, Serial No. 685,411

6 Claims. (Cl. 229—3.5)

This invention relates to a new package. It includes the package and the method of making it.

The material from which the package of this invention is made comprises a flexible backing or supporting material, such as paper, fabric, netting, etc., which is coated with a thermoplastic rubber derivative. The material to be packaged is enclosed in this and the edges are then sealed by the application of heat. No cement is required because the rubber derivative used is one which is non-tacky at ordinary temperatures but becomes soft and sticky when heated, preferably at between 110 and 120° C. By heating all of the exposed edges, an hermetically sealed package is formed and this constitutes a preferred form of the invention.

The package of this invention is designed particularly for use where a water-proof wrapping is desired and a rubber hydrohalide, such as rubber hydrochloride or rubber hydrobromide is used as the water-proofing agent. A flux or plasticizing agent may be added, and coloring matter, such as benzol soluble dyes, may be used where a colored package is desired. The rubber derivative is advantageously applied to the flexible backing by being brought into solution in a suitable solvent, such as benzene or chloroform or carbon tetrachloride, and then sprayed or spread or brushed onto the supporting material or frictioned into it.

The package may, for example, be prepared as follows: 2 pounds of plasticized pale crepe rubber are dissolved in 313 pounds of commercial benzene. The cement is cooled to about 10° C. and hydrogen chloride gas is bubbled through it with stirring for about 6 hours or until the increase in weight of the composition, due to the introduction of hydrogen chloride, is about 1.16 pounds. The hydrogen chloride and rubber are then allowed to react at room temperature until a sample which has been washed and dried indicates on analysis between 28 and 30.5%, and preferably between 29 and 30.5% of chlorine. This generally takes about 20 hours.

The rubber hydrochloride cement is then preferably steam distilled to remove the benzene and the greater part of the uncombined hydrogen chloride. The mass of incompletely saturated rubber hydrochloride is then broken up on a rubber mill and washed thoroughly with water and then dried in a vacuum at approximately 160° F. The washed material is dissolved in about 20 parts by weight of chloroform or other suitable solvent. An age resister is advantageously added. A suitable age resister is a mixture of 3% of di tetra hydro furfuryl amine or dicyclo hexyl amine and 1½% of hexamethylene tetramine. Other age resisters which may be used include diphenylguanidine, cyclo hexyl amino acetonitrile, and methylene amino acetonitrile and mixtures of these.

The cement thus prepared is applied to the flexible supporting medium in any suitable way. If paper is used as the supporting medium, the cement may be sprayed or brushed or spread onto one or both sides. If a fabric is employed, the cement may be frictioned into the fabric. Several coatings of the rubber hydrochloride may be applied in this way. Where the package is to be used for fruit, for example, or other material which is to be displayed in the package, netting may advantageously be used as the supporting medium and the rubber derivative will then be applied in such a way as to form a transparent film in the meshes of the netting. This may be done by laying the netting on an endless belt such as a belt of cellulose nitrate and spraying the netting with the cement and then passing the belt with the netting and rubber hydrochloride through rolls.

Rubber hydrochloride which has a chlorine content of 27 to 30.5% is flexible, waterproof and oilproof and a package formed from paper or other supporting medium coated with such a rubber hydrochloride is waterproof and oilproof and these properties are not destroyed by flexing the paper. It is advantageous to add some age-resisting material to prolong the period during which the rubber hydrochloride remains flexible, and a thermally sealed package made waterproof and oilproof with rubber hydrochloride and an age-resister constitutes a preferred embodiment of this invention. The rubber hydrochloride with a chlorine content of 27 or 28 to 29% is somewhat softer than that with a somewhat higher chlorine content and does not dry as quickly and, therefore, a rubber hydrochloride with 29 to 30.5% chlorine is preferred in making the package of this invention. Rubber hydrochloride with much less than 27% chlorine is too sticky for use as a packaging material. Rubber hydrochloride with a chlorine content of over 30.5% is quite brittle and, therefore, is not as satisfactory for most packages as a rubber hydrochloride of lower chlorine content. However, by adding a suitable plasticizer to a brittle hydrochloride, a flexible material may be formed. Ordinarily, the addition of a plasticizer lowers the water-resistivity of the rubber hydrochloride.

In forming the package the supporting material coated or impregnated with the rubber derivative is wrapped around the material to be packaged and the exposed edges are thermally sealed. By heating all of the exposed edges a hermetically sealed package is formed and where a water-tight package is desired rubber hydrochloride with 29 to 30.5% chlorine is advantageously used and all of the edges are sealed by heating. A rubber hydrochloride of this chlorine content softens at 110 and 120° C. so that by heating to this temperature and pressing the edges together an air-tight package is formed. The heating may advantageously be done by passing a heated iron over the exposed edges. If an air-tight package is not required it is not necessary to seal all of the edges and the edges of the packaging material may be fastened by applying heat at several points along each seam. If an air-tight package is desired the supporting medium, if paper or a fabric, is advantageously coated on both sides or if only on one side it is preferable to coat the inner surface.

A package formed in this way may be used for packaging fruits and vegetables or other food products and a great variety of other material such as smoking materials. For example, a water-proof package for cigarettes may be made by coating the usual wrapper with a thermoplastic rubber derivative. A colorless transparent rubber derivative will be preferred in many instances, as, for example, where cigarettes are to be packaged and the usual marking of the package is to be exposed to view. By coating both sides or an ordinary cigarette package wrapper with a solution of a rubber hydrochloride containing 29 to 30.5% chlorine, evaporating the solvent and then wrapping the cigarettes and sealing the exposed edges of the wrapper by heating with a hot iron under sufficient pressure to cause the edges to adhere a waterproof package is readily formed.

A great variety of supporting media may be employed and a flexible supporting medium will generally be preferred, although for candy boxes, etc., a stiff supporting medium may be used and the cover sealed to the box by the application of heat and pressure.

In the drawing several forms of supporting media are shown coated with rubber hydrochloride and a detail of a package formed by thermal sealing is also shown.

Figure 2:
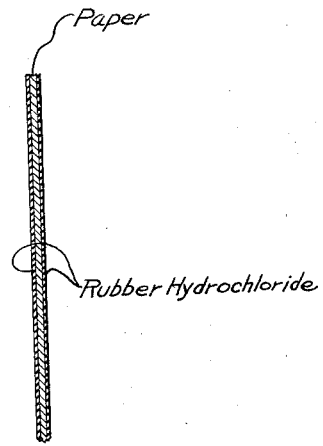
Figure 3:
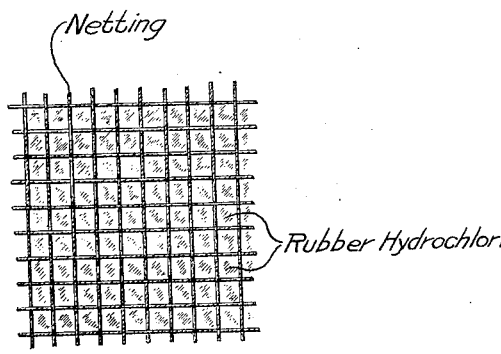
Figure 4:
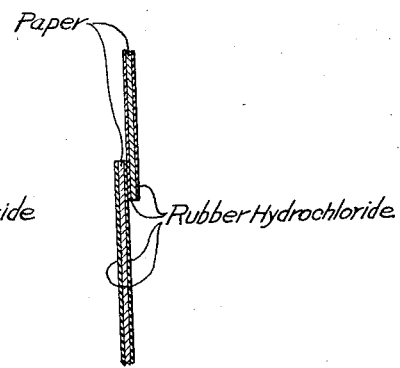

Fig. 1 shows a sheet of paper coated on one side with rubber hydrochloride. Fig. 2 shows a sheet of paper coated on both sides with rubber hydrochloride. Fig. 3 shows a section of netting, with a film of rubber hydrochloride in the meshes. Fig. 4 is a detail showing two portions of a single sheet of paper, which is coated on both sides with rubber hydrochloride and thermally sealed by pressing the two pieces together while heating to about 110-120° C. to cause the rubber hydrochloride on each sheet to soften and the two sheets to thus adhere together.

It is intended that the patent shall cover, by suitable expression in the appended claims, whatever features of patentable novelty reside in the invention.

What I claim is:

1. In the enclosing member of a package at a seam between two pieces of a backing material supporting a continuous film composed essentially of a non-tacky rubber hydrochloride, or at a seam between two portions of a single piece of backing material supporting a continuous film composed essentially of a non-tacky rubber hydrochloride, a bond of rubber hydrochloride formed by coalescence of the rubber hydrochloride supported by said two pieces or portions of backing material.

2. As the enclosing member of a package a film composed essentially of a non-tacky rubber hydrochloride strengthened by a flexible supporting material to which the film is united and at the seams of the supporting material a continuous rubber hydrochloride seam formed by coalescence of the rubber hydrochloride supported by said material.

3. In a package and forming at least a portion of the wrapper, a flexible openwork structure to give strength to that portion of the wrapper in which it occurs and in the openings of said structure a flexible transparent film composed essentially of a non-tacky rubber hydrochloride.

4. As the enclosing member of a package, flexible netting the openings of which are closed by a flexible transparent film composed essentially of a non-tacky rubber hydrochloride, the rubber hydrochloride in the different pieces or portions of the netting brought together at the seams being united by coalescence.

5. As the enclosing member of a package of cigarettes, paper waterproofed on at least one side with a transparent film composed essentially of a flexible, non-tacky rubber hydrochloride which can be flexed without destroying its waterproofing properties, and between overlapping portions of the waterproofed paper a bond of rubber hydrochloride formed by coalescence of the rubber hydrochloride film supported by said paper.

6. The method of forming a package which comprises enclosing material with a wrapper composed of a flexible material coated with a film composed essentially of a flexible, non-tacky rubber hydrochloride and sealing overlapping portions of the material by the application of heat and pressure so as to coalesce the rubber hydrochloride supported by said overlapping portions.

WILLIAM C. CALVERT.